(12) United States Patent
Levy

(10) Patent No.: US 10,185,101 B2
(45) Date of Patent: Jan. 22, 2019

(54) PLUG WITH ROTATABLE RELEASE MECHANISM

(71) Applicant: BELDEN CANADA INC., Saint-Laurent (CA)

(72) Inventor: Moise Levy, Laval (CA)

(73) Assignee: BELDEN CANADA INC., Saint-Laurent (CA)

( * ) Notice: Subject to any disclaimer, the term of this patent is extended or adjusted under 35 U.S.C. 154(b) by 0 days.

(21) Appl. No.: 15/840,551

(22) Filed: Dec. 13, 2017

(65) Prior Publication Data

US 2018/0172922 A1 Jun. 21, 2018

Related U.S. Application Data

(60) Provisional application No. 62/434,544, filed on Dec. 15, 2016.

(51) Int. Cl.
*G02B 6/38* (2006.01)
*G02B 6/44* (2006.01)

(52) U.S. Cl.
CPC ......... *G02B 6/3893* (2013.01); *G02B 6/3898* (2013.01); *G02B 6/4471* (2013.01)

(58) Field of Classification Search
CPC ............................ G02B 6/3893; G02B 6/3898
See application file for complete search history.

(56) References Cited

U.S. PATENT DOCUMENTS

2004/0190849 A1* 9/2004 Chamorro ............ G02B 6/4439
385/134

* cited by examiner

*Primary Examiner* — Jerry Rahll
(74) *Attorney, Agent, or Firm* — Hugh Mansfield

(57) ABSTRACT

A plug assembly comprising at least one elongate ferrule terminating an one optic fiber and arranged in parallel to an actuating axis, a plug housing the ferrule and such that an end of the ferrule is exposed at a forward end thereof, the forward end configured for insertion into a receptacle, an elongate release lever for releasably securing the plug housing to the receptacle, the lever comprising a first end fixed to the plug housing towards the forward end and a flexible free end, and an actuating assembly cooperating with the flexible free end and rotatable about the actuating axis between a position where the flexible free end is positioned spaced from the housing and a position where the flexible free end is positioned immediately adjacent the housing.

10 Claims, 6 Drawing Sheets

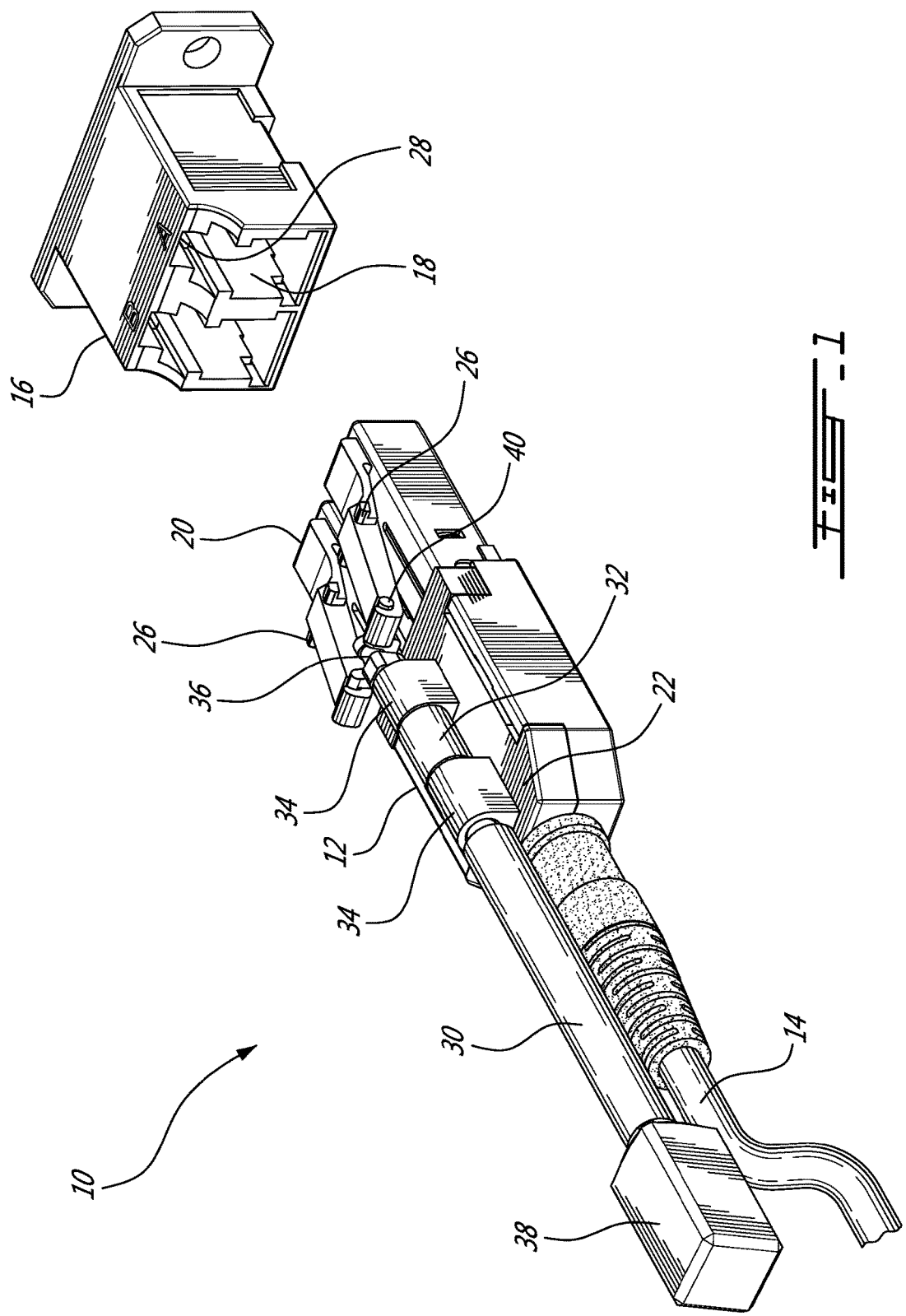

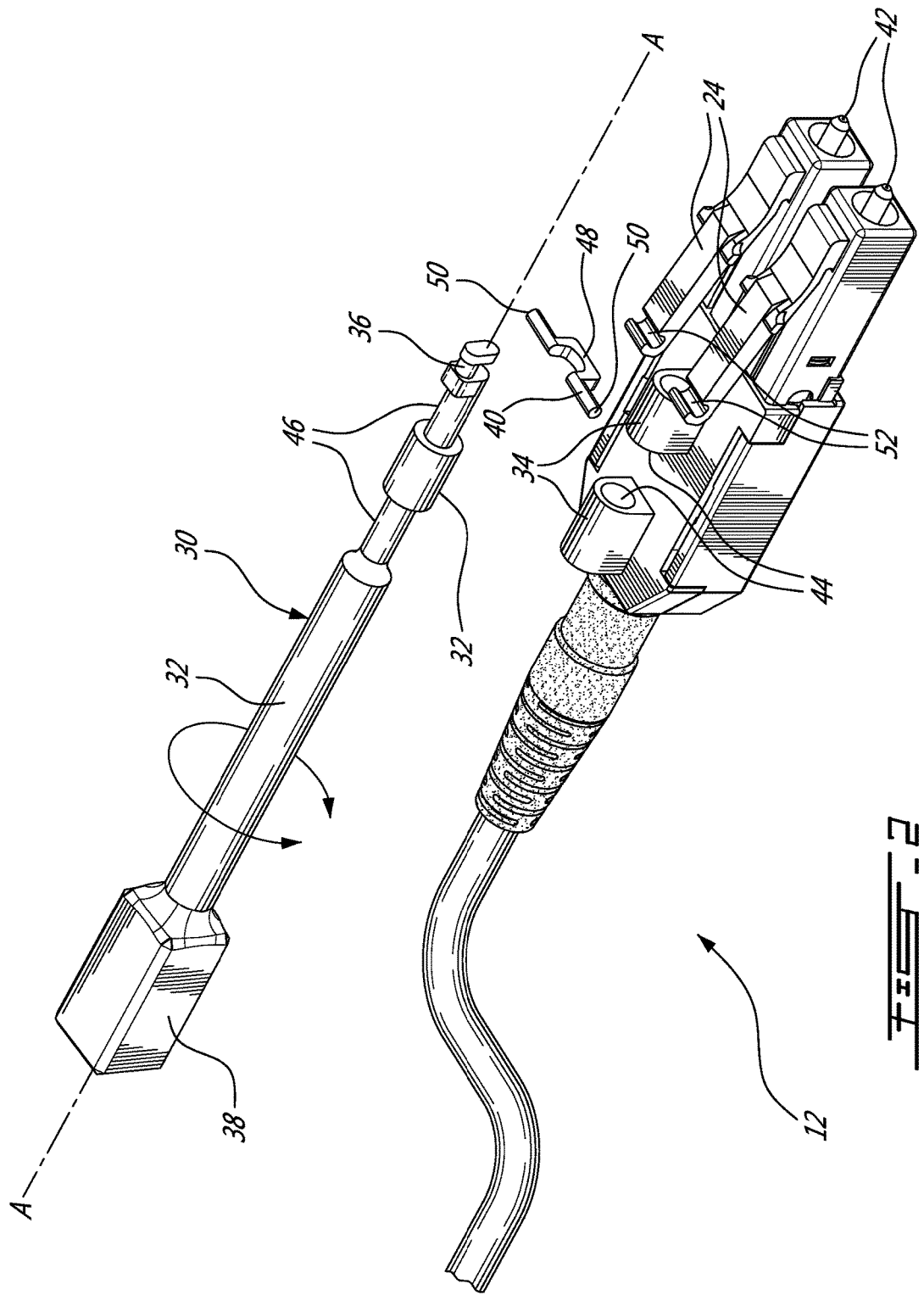

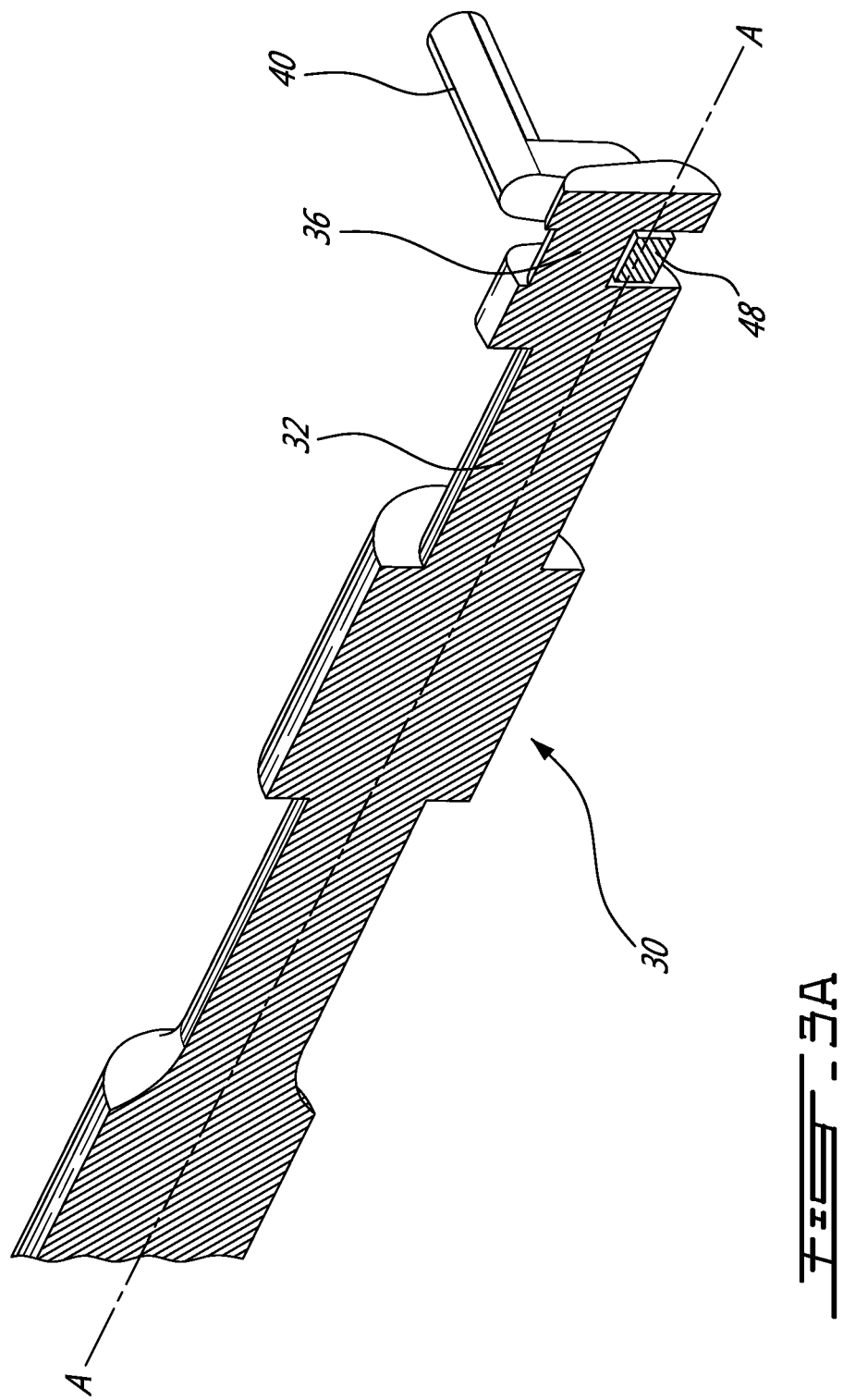

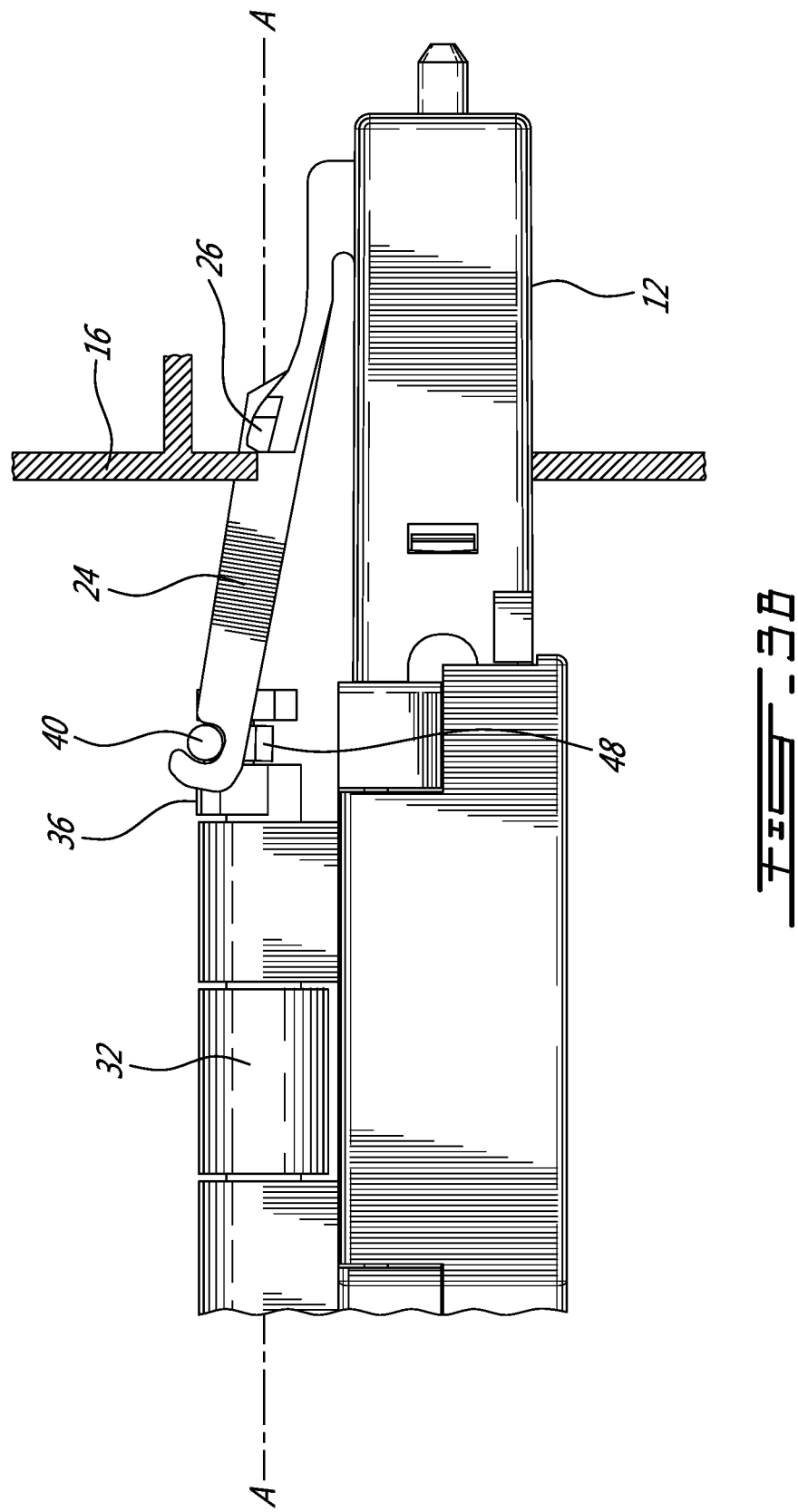

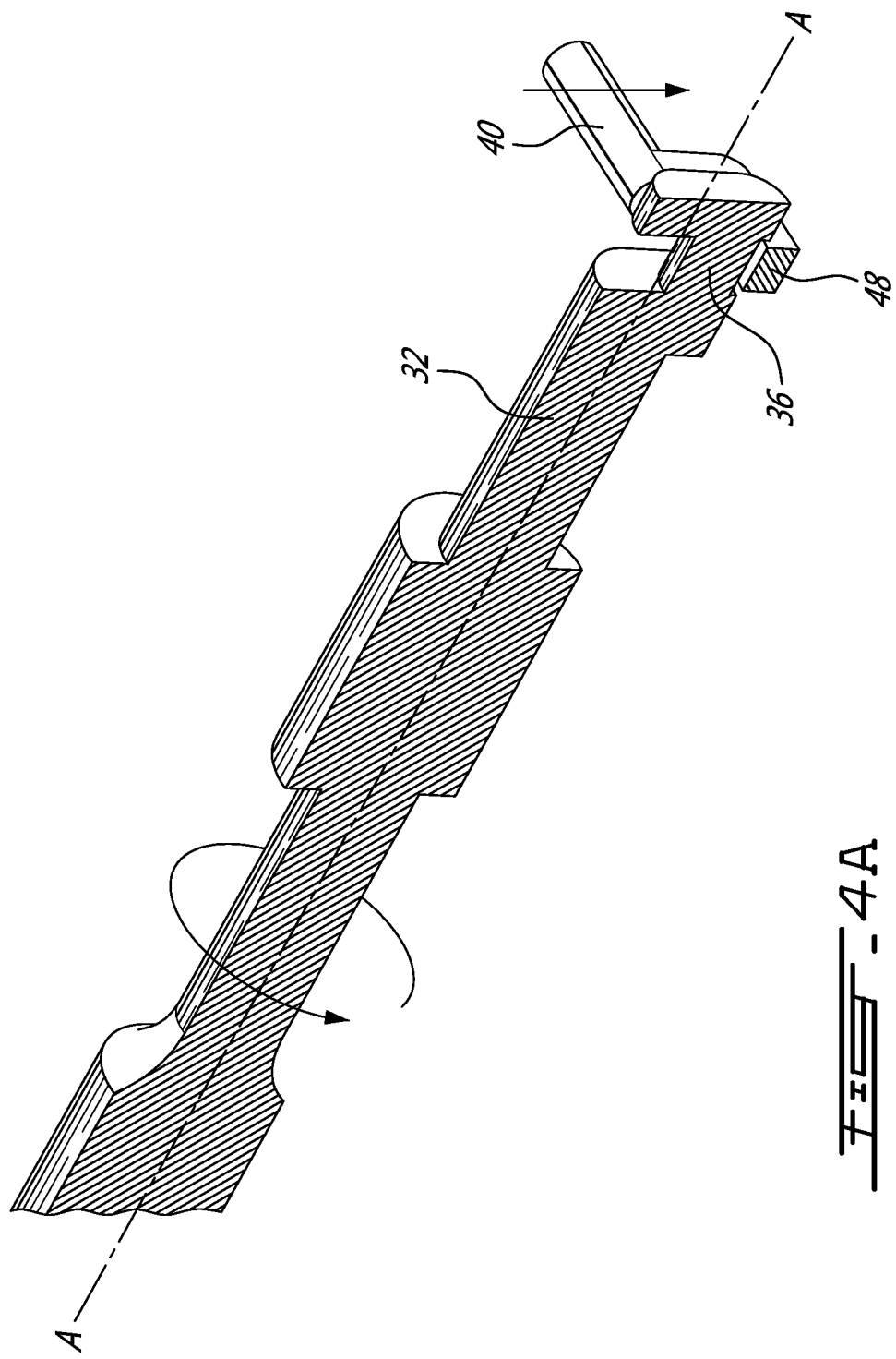

PLUG WITH ROTATABLE RELEASE MECHANISM

CROSS REFERENCE TO RELATED APPLICATIONS

This application claims benefit under 35 U.S.C. § 119(e) of U.S. provisional application Ser. No. 62/434,544 filed on Dec. 15, 2016 which is incorporated herein in its entirety by reference.

FIELD OF THE INVENTION

The present invention relates to a plug with rotatable release mechanism, in particular for use in high density fiber optic applications.

BACKGROUND TO THE INVENTION

In data centres and the like, large numbers of networking devices, such as switches, firewalls, servers, patch panels and the like are arranged in 19" racks and interconnected using a plurality of plug and cable assemblies which mate with receptacles on the devices. Many of the networking devices have many such receptacles. For example, a switch may have 72 outputs in a 1U rack space. As a result, the spacing between adjacent receptacles is small and although insertion of a plug into a receptacle is possible, releasing a plug from a receptacle can prove difficult as, given the close proximity of adjacent plugs, pressing a release tab is hampered.

SUMMARY OF THE INVENTION

In order to address the above, there is provided a plug assembly for terminating at least one optic fiber with a receptacle assembly comprising at least one receptacle. The plug assembly comprises at least one elongate ferrule each terminating a respective one of the at least one optic fiber and arranged in parallel to an actuating axis, at least one plug housing each housing a respective one of the at least one ferrule and such that a ferrule end of the respective ferrule is exposed at a forward end thereof, the forward end configured for insertion into one of the at least one receptacles, at least one elongate release lever for releasably securing a respective one of the at least one plug housing to the respective receptacle, each of the at least one lever comprising a first end fixed to a respective one of the at least one plug housing towards the forward end and a flexible free end, and an actuating assembly cooperating with each of the flexible free end and rotatable about the actuating axis between a first position wherein each of the flexible free end is positioned spaced from the housing and a second position wherein the at least one flexible free end is positioned immediately adjacent the housing.

There is also provided a plug assembly for terminating a pair of optic fibers and insertion into a receptacle assembly comprising a pair of receptacles. The plug assembly comprises a pair of elongate ferrules each terminating a respective one of the pair of optic fibers, a pair of plug housings each housing a respective one of the ferrules such that the ferrules are arranged side by side in parallel in a spaced duplex configuration and such that for each plug housing a ferrule end of the respective ferrule is exposed at a forward end thereof, the forward end configured for insertion into a respective one of the receptacles, a pair of elongate release levers arranged side by side, spaced and in parallel for releasably securing a respective one of the plug housings to the respective receptacle, the levers each comprising a first end fixed to a respective one of the plug housings towards the forward end and a flexible free end positioned normally spaced from the plug housing, a transverse pin interconnecting the flexible free ends and spanning a space therebetween, and an actuating assembly arranged for rotation as a unit about an actuating axis in parallel to the ferrules and comprising a handle, an eccentric part and an elongate concentric part interconnecting the handle and the eccentric part. The transverse pin is positioned between the eccentric part and the plug housing adjacent the eccentric part and further wherein by rotation of the actuating assembly about the actuating axis the eccentric part urges the transverse pin towards the housing.

BRIEF DESCRIPTION OF THE DRAWINGS

FIG. 1 is a raised right rear perspective view of a system for terminating an optic fiber comprising a plug with a rotatable release mechanism and in accordance with an illustrative embodiment of the present invention; and FIG. 2 is a partially exploded perspective view of a plug with a rotatable release mechanism in accordance with an illustrative embodiment of the present invention;

FIGS. 3A and 4A provide sectional views of a rotatable release mechanism in accordance with an illustrative embodiment of the present invention respectively in a first normal position and a second actuated position; and FIGS. 3B and 4B provide right plan views of a rotatable release mechanism in accordance with an illustrative embodiment of the present invention respectively in a first normal position and a second actuated position.

DETAILED DESCRIPTION OF THE ILLUSTRATIVE EMBODIMENTS

Figure 4B:
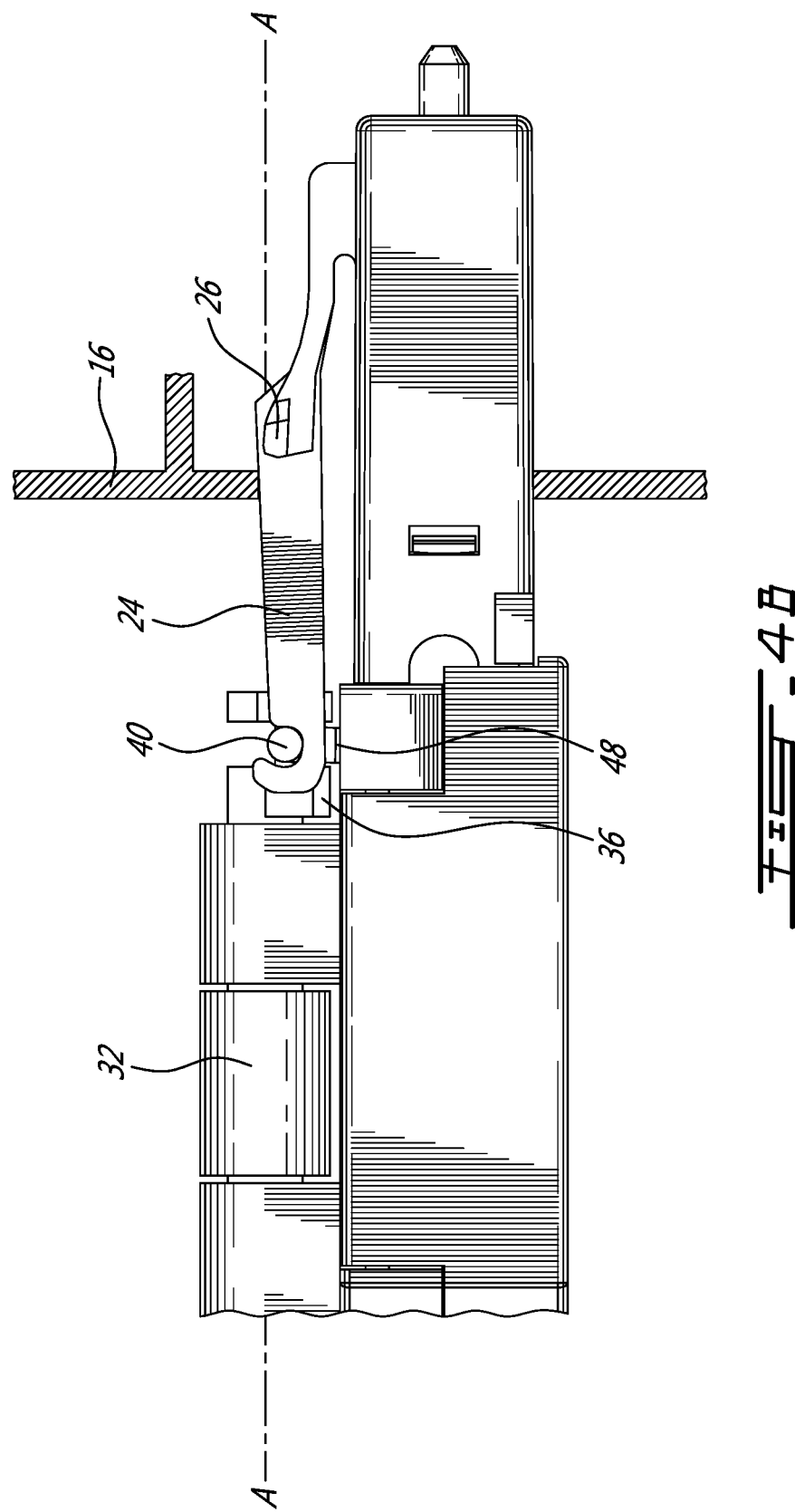

Referring now to FIG. 1, a system for terminating an optic fiber, generally referred to using the reference numeral 10, will now be described. The system 10 comprises a plug assembly 12 terminating a cable 14, such as an optic fibre cable, which is configured for insertion into a receptacle comprising a receptacle housing 16. The receptacle housing 16 defines an opening 18 which matches the outer shape of a forward end 20 of a plug housing 22 and such that the plug assembly 12 can be inserted into the receptacle 16. A flexible release lever 24 is attached towards the forward end 20 with a free end extending backwards away from the forward end 20. On insertion, tabs 26 on a flexible release lever 24 are engaged in a slot 28 in the opening 18 and such that plug assembly 12 is releasably secured to the receptacle 16.

Still referring to FIG. 1, the plug 12 further comprises a rotatable release mechanism 30 comprising an elongate concentric part 32 secured for rotation to the plug housing 22 by a pair of collars 34 and which interconnects an eccentric part 36 with a handle 38. The eccentric part 36 of the rotatable release mechanism 30 actuates the flexible release levers 24 via a linkage comprising a transverse pin 40 which spans the space between the flexible free ends of the flexible release levers 24. In this regard, the plug housings 22 are illustratively arranged in pairs in a duplex configuration such that the eccentric part 36 is positioned between the pair of flexible release levers 24.

Referring now to FIG. 2, the elongate concentric part 32, the eccentric part 36 and the handle 38 are arranged for rotation about an actuating axis A-A which runs generally along a length of the plug assembly 12 in parallel to the ferrules 42 which terminate the optic fibres. In this regard the collars 34 each comprise a bore 44 which receives a narrowed portion 46 of the concentric part 32 in a rotary fit. As will be discussed in more detail below, the concentric part 30 is connected to an eccentric part 36 which is positioned off centre and such that rotation of the concentric part 32 causes the eccentric part 36 to reciprocate about the actuating axis A-A. Similarly, the transverse pin 40 comprises a U shaped saddle 48 which, when assembled, engages the eccentric part 36 for movement herewith.

Still referring to FIG. 2, the outer ends 50 of the transverse pin 40 are received into respective u-shaped gripping bores 52 of the flexible release levers 26. In this regard the outer ends 50 are simply snapped into the gripping bores 52 and such that the outer ends 50 are retained by the gripping bores 52.

Referring now to FIGS. 3A and 3B, in a first normal orientation of the rotatable release mechanism 30 the eccentric part 36 is positioned on an outside of the actuating axis A-A. In this position the eccentric part 36 only lightly engages the U-shaped saddle 48 of the transverse pin 40 and such that the flexible release lever 24 rests in its normally unflexed position. If positioned within a receptacle 16, the tabs 26 are engaged by the receptacle and such that the plug 12 is retained within the receptacle 16.

Referring to FIGS. 4A and 4B in addition to FIGS. 3A and 3B, rotation of the concentric part 32 about the actuating axis A-A reverses the orientation of the eccentric part 36 relative to the actuating axis A-A and such that the eccentric part 36 engages the U-shaped saddle 48 forcing it away from the actuating axis A-A and towards the plug housing 22. This in turn forces the transverse pin 40 towards the plug housing 22 and the free ends of the flexible release lever 24. The tabs 26 are disengaged from the receptacle in this manner and such that the plug 12 can be retracted from the receptacle 16.

One advantage of the above rotatable system is that the free ends of the flexible release levers 24 are actuated without any force being generated in a direction which is parallel to the actuating axis A-A. Indeed, the forces which are brought to bear on the transverse pin 40 are substantially entirely perpendicular to the actuating axis A-A. As a result, the tabs 26 are significantly easier to free from the receptacle 16, especially in the case of metal receptacles and the like where imperfections on the inside walls of the receptacles 16 have a tendency to grip the tabs 26, and which is intensified if a force parallel to the actuating axis A-A and away from the receptacle is exerted on the plug prior to the flexible release levers 24 being moved from their normal position to an actuated position.

Although the present invention has been described hereinabove by way of specific embodiments thereof, it can be modified, without departing from the spirit and nature of the subject invention as defined in the appended claims.

I claim:

1. A plug assembly for terminating pair of optic fibers with a receptacle assembly comprising a pair of receptacles, the plug assembly comprising:
    a pair of elongate ferrules each terminating a respective one of the pair of optic fibers and arranged in parallel to an actuating axis;
    a pair of plug housings each housing a respective one of said pair of ferrule and such that a ferrule end of said respective ferrule is exposed at a forward end thereof, said forward end configured for insertion into one of the at least one receptacles;
    a pair of elongate release levers for releasably securing a respective one of said pair of plug housings to the respective receptacle, each of said pair of levers comprising a first end fixed to a respective one of said plug housings towards said forward end and a flexible free end;
    a transverse pin interconnecting said flexible free ends and spanning a space therebetween; and
    an actuator comprising an eccentric part, said transverse pin positioned between said eccentric part and said plug housing adjacent said eccentric part and rotatable about said actuating axis such that when rotated said eccentric part urges said transverse pin towards said housing thereby moving said flexible free ends between a first position wherein each of said flexible free end is positioned spaced from said housing and a second position wherein said at least one flexible free end is positioned immediately adjacent said housing.

2. The plug assembly of claim 1, wherein in said first position each of said at least one free end is positioned normally spaced from said respective one of said at least one plug housing.

3. The plug assembly of claim 1, wherein said actuating assembly further comprises a handle and an elongate concentric part interconnecting said handle and said eccentric part.

4. The plug assembly of claim 1, wherein each of said free ends comprises a bore arranged along a common axis and said transverse pin is received within said bores along said common axis.

5. The plug assembly of claim 4, wherein each of said bore comprises a u-shaped gripping bore and wherein during assembly each end of said transverse pin is snapped into a respective one of said u-shaped gripping bore.

6. The plug assembly of claim 1, wherein the receptacles are identical and said plug housings are identical.

7. A plug assembly for terminating a pair of optic fibers and insertion into a receptacle assembly comprising a pair of receptacles, the plug assembly comprising;
    a pair of elongate ferrules each terminating a respective one of the pair of optic fibers;
    a pair of plug housings each housing a respective one of said ferrules such that said ferrules are arranged side by side in parallel in a spaced duplex configuration and such that for each plug housing a ferrule end of said respective ferrule is exposed at a forward end thereof, said forward end configured for insertion into a respective one of the receptacles;
    a pair of elongate release levers arranged side by side, spaced and in parallel for releasably securing a respective one of said plug housings to the respective receptacle, said levers each comprising a first end fixed to a respective one of said plug housings towards said forward end and a flexible free end positioned normally spaced from said plug housing;
    a transverse pin interconnecting said flexible free ends and spanning a space therebetween; and
    an actuator arranged for rotation as a unit about an actuating axis in parallel to said ferrules and comprising a handle, an eccentric part and an elongate concentric part interconnecting said handle and said eccentric part;
    wherein said transverse pin is positioned between said eccentric part and said plug housing adjacent said eccentric part and further wherein by rotation of said actuator about said actuating axis said eccentric part urges said transverse pin towards said housing.

8. The plug assembly of claim 7, wherein each of said free ends comprises a bore arranged along a common axis and said transverse pin is received within said bores along said common axis.

9. The plug assembly of claim 8, wherein each of said bore comprises a u-shaped gripping bore and wherein during assembly each end of said transverse pin is snapped into a respective one of said u-shaped gripping bore.

10. The plug assembly of claim 7, wherein the receptacles are identical and said plug housings are identical.

* * * * *